United States Patent [19]

Weiss et al.

[11] Patent Number: 5,059,885

[45] Date of Patent: Oct. 22, 1991

[54] BATTERY CHARGER WITH BATTERY POSITIONING AND SUPPORT APPARATUS

[75] Inventors: Gary R. Weiss, Wheeling; Leonid Soren, Lincolnwood, both of Ill.

[73] Assignee: Motorola, Inc., Schaumburg, Ill.

[21] Appl. No.: 397,220

[22] Filed: Aug. 23, 1989

[51] Int. Cl.⁵ .......................... H02J 7/00; H01M 10/46
[52] U.S. Cl. ........................................... 320/2; 320/15; 429/100
[58] Field of Search ................. 320/2, 15; 429/96–100

[56] References Cited

U.S. PATENT DOCUMENTS

| | | | |
|---|---|---|---|
| D. 229,500 | 12/1973 | Krumin et al. | D13/5 |
| D. 241,555 | 9/1976 | Goldman et al. | D13/5 |
| D. 271,391 | 11/1983 | Scheid | D13/5 |
| D. 274,903 | 7/1984 | Eckmann et al. | D13/5 |
| D. 276,149 | 10/1984 | Eckmann et al. | D13/5 |
| D. 278,704 | 5/1985 | Claxton et al. | D13/5 |
| D. 297,827 | 9/1988 | Lay | D13/6 |
| D. 298,119 | 10/1988 | Richards et al. | D13/6 |
| D. 298,230 | 10/1988 | Lay | D13/6 |
| 3,333,911 | 8/1967 | Errichiello et al. | 312/223 |
| 3,370,987 | 2/1968 | Rush | 429/98 |
| 3,390,319 | 6/1968 | Robison | 320/2 |
| 3,665,285 | 5/1972 | Mullersman et al. | 320/2 |
| 3,917,372 | 11/1975 | Selinko | 439/298 |
| 4,050,003 | 9/1977 | Owings et al. | 320/2 |
| 4,091,318 | 5/1978 | Eichler et al. | 320/2 |
| 4,141,616 | 2/1979 | Gottlieb | 439/263 |
| 4,214,197 | 7/1980 | Mann et al. | 320/2 |
| 4,419,616 | 12/1983 | Baskins et al. | 320/2 |
| 4,684,870 | 8/1987 | George et al. | 320/20 |

OTHER PUBLICATIONS

Jasinski, "Chargers for Batteries with Auxiliary Cells", Motorola Technical Developments, vol. 8, Oct. 1988.
Radio Shack, 1988, Catalog No. 419, p. 150.
Motorola Inc., Model TPN6157A: AC Trickle Charger, Manual No. 68P81069E76-A, Oct. 15, 1985.
Motorola, Inc., Model SLN2097A: AC/Auto Travel Charger, Manual No. 68P81117E47-A, Oct. 31, 1986, pp. 1–9 and 11.

*Primary Examiner*—R. J. Hickey
*Attorney, Agent, or Firm*—Raymond A. Jenski; Rolland R. Hackbart

[57] ABSTRACT

A battery charger having positioning and support apparatus for aligning batteries of varying sizes is disclosed. A recess in the battery charger housing has tapering sides which produce a charging pocket wider toward the front of the charger than toward the rear. Batteries of varying thickness have sloping sides which conform to the angle of taper of the battery charger. Rib members on the tapering sides engage slots in the batteries such that the batteries upon insertion into the charging pocket are initially guided by the tapering sides and then accurately positioned by the rib members.

22 Claims, 3 Drawing Sheets

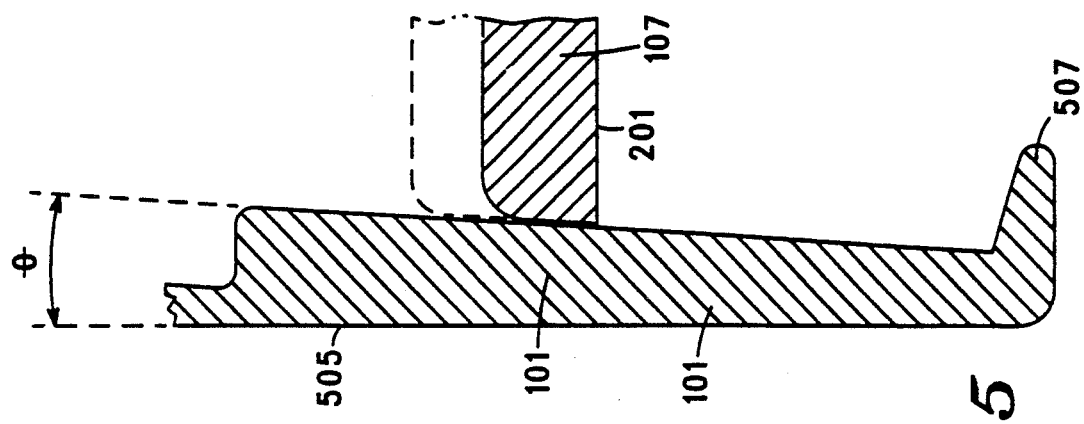
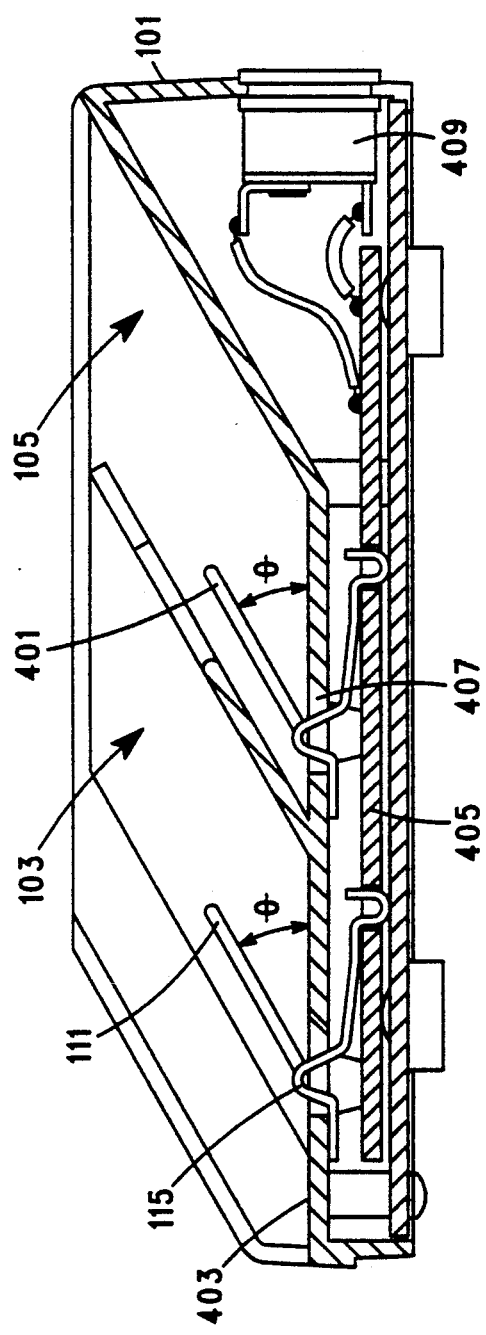

BATTERY CHARGER WITH BATTERY POSITIONING AND SUPPORT APPARATUS

BACKGROUND OF THE INVENTION

This invention relates generally to an apparatus for guiding and holding rechargeable batteries in a battery charger and more particularly to a battery charger apparatus having a battery pocket configuration and guides such that batteries of different charge capacities and sizes may be properly positioned and supported while being charged.

It is a statement of the obvious to state that rechargeable batteries are intended to be recharged. Devices which perform this recharging function are quite well known.

Portable electronic equipment traditionally employs rechargeable batteries and many varied designs of battery chargers have been developed to recharge the batteries. In many instances, the electrochemical cells which comprise the battery are housed or contained in an enclosure which provides protection and support for the electrochemical cells. For example, a detachable battery housing containing several electrochemical cells is employed in a portable cellular radiotelephone (model number F09HGD8453AA) manufactured by Motorola, Inc. and having an appearance similar to that shown in U.S. patent application Ser. No. 255,696, "Portable Telephone, Telephone Handset, or Similar Article", filed on Oct. 11, 1988 on behalf of Soren et al. and assigned to the assignee of the present invention. The appearance of the battery housing is similar to that shown in U.S. patent application Ser. No. 179,006, "Battery Housing For A Portable Telephone Or Similar Article", filed on Apr. 8, 1988 on behalf of Soren et al. and assigned to the assignee of the present invention.

Conventionally, battery chargers utilize a charging pocket or pockets to generally hold batteries. In some instances, spacer ribs are located within the charging pocket to prevent binding between the battery housing and the housing of the charger. These chargers, however, are designed to accommodate a single size battery housing. Batteries are likely to have different sizes and charge capacities. Such variations can cause the battery charger associated with the batteries to become overly complex to accommodate the batteries.

SUMMARY OF THE INVENTION

Accordingly, the present invention solves the problem of accommodating different battery sizes without undue complexity.

It is one object of the present invention to position a battery housing within a battery charger.

It is another object of the present invention to employ a locating channel and a sloped battery charger housing to correctly position batteries of varying sizes within the battery charger.

It is a further object of the present invention to utilize the housing of the battery charger to position batteries of varying sizes and maintain such position with the force of gravity.

BRIEF DESCRIPTION OF THE DRAWINGS

FIG. 4 is a cross-sectional view of a battery charger housing which employs the present invention.

FIG. 5 is a cross-sectional detail view of the housing of a battery charger employing the present invention and showing a battery positioned against the battery charger housing.

DETAILED DESCRIPTION OF THE PREFERRED EMBODIMENT

The invention disclosed herein is of a battery charger with a housing having the capability of guiding and holding the housing of rechargeable batteries such that the battery housing may be properly positioned and supported while the batteries are being charged. Such an apparatus is shown in the isometric view of FIG. 1. Here, a battery charger (101) has two recesses (103 and 105) into either of which a battery (107) may be placed. Although two recesses are shown, the present invention may be employed in battery housings having one or more such recesses. A battery charger having a similar appearance has been disclosed in U.S. patent application Ser. No. 264,304, "Battery Charger or Similar Article", filed on Oct. 27, 1988 on behalf of Soren et al. and assigned to the assignee of the present invention. The operation of the electrical portion of a similar battery charger has been disclosed in U.S. patent application Ser. No. 361,534, "Multiple Battery, Multiple Rate Battery Charger", filed on June 5, 1989 on behalf of Johnson et al. and assigned to the assignee of the present invention.

Figure 1:
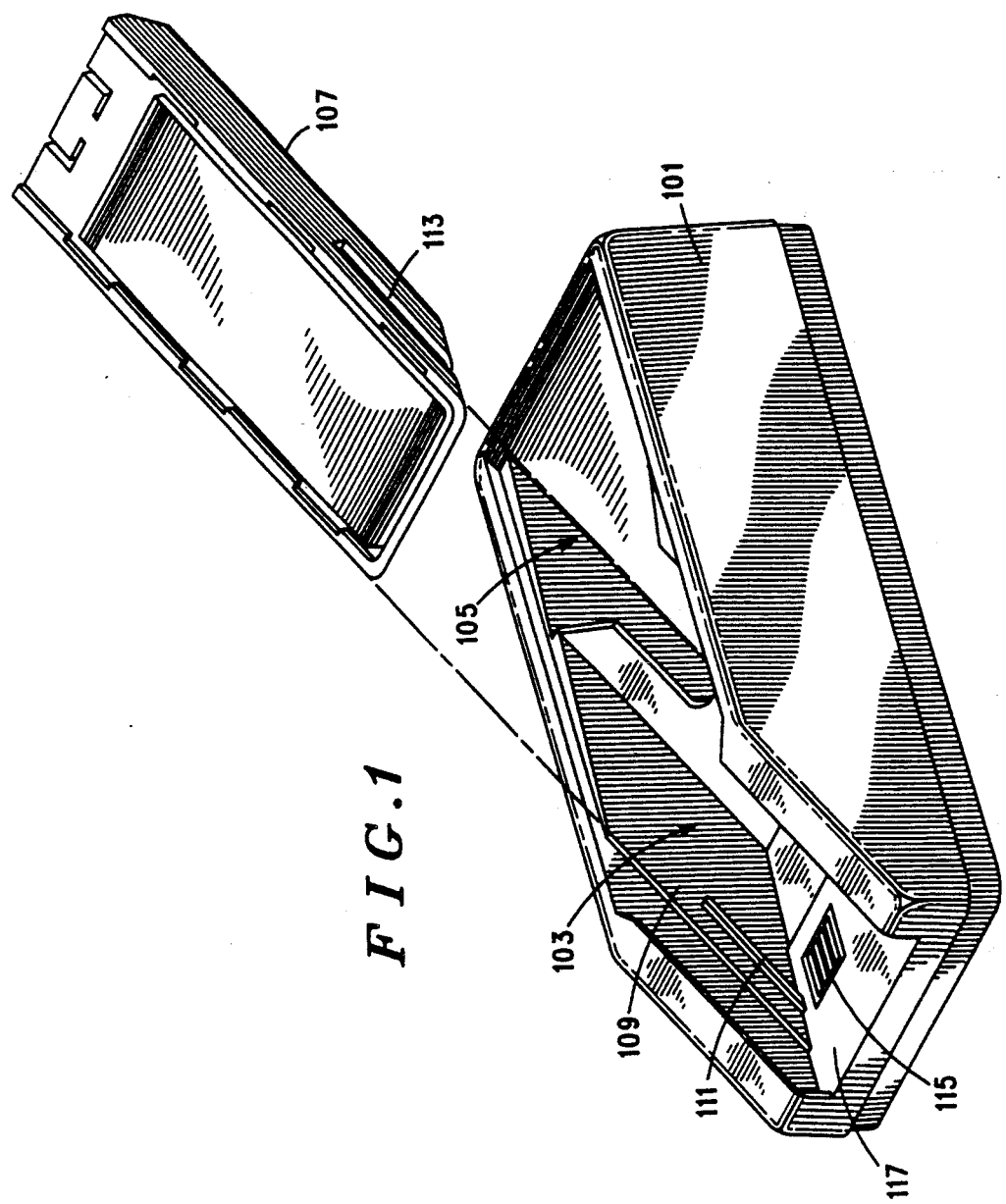
FIG. 1 is an isometric view of the battery charger of the present invention and illustrating a battery to be charged.

User operation of the battery charger of FIG. 1 is accomplished by placing a battery (107) in one of the recesses (103 or 105) by elevating the battery (107) over the top surface and somewhat to the rear of the battery charger housing (101) and sliding the battery down and toward the front of the battery charger housing (101) such that the battery (107) slides against the interior side surfaces (visible as side surface (109)). Once the battery (107) enters a recess, for example recess 103, it will engage rib members disposed on opposite side surfaces of the battery housing (101). One such rib member (111) is visible in the view of FIG. 1. Another rib member is located on the interior side wall surface directly opposite the side wall surface (109). This rib member is not visible in the view of FIG. 1. Rib member (111) engages a slot (113) in the battery housing (107) to direct the battery toward charging contacts (115) and enable the proper charging of the electrochemical cells of the battery. It is an important feature of the present invention that the side surfaces of the battery charger housing (101) and the rib members (for example, rib member (111) of the battery charger housing (101) cooperate in directing the battery against the battery charging contacts. The battery is held in the proper orientation against the charging contacts (115) by the rib members and the unique battery charger shape directing the weight of the battery with a minimum of complexity of battery charger design.

Figure 2:
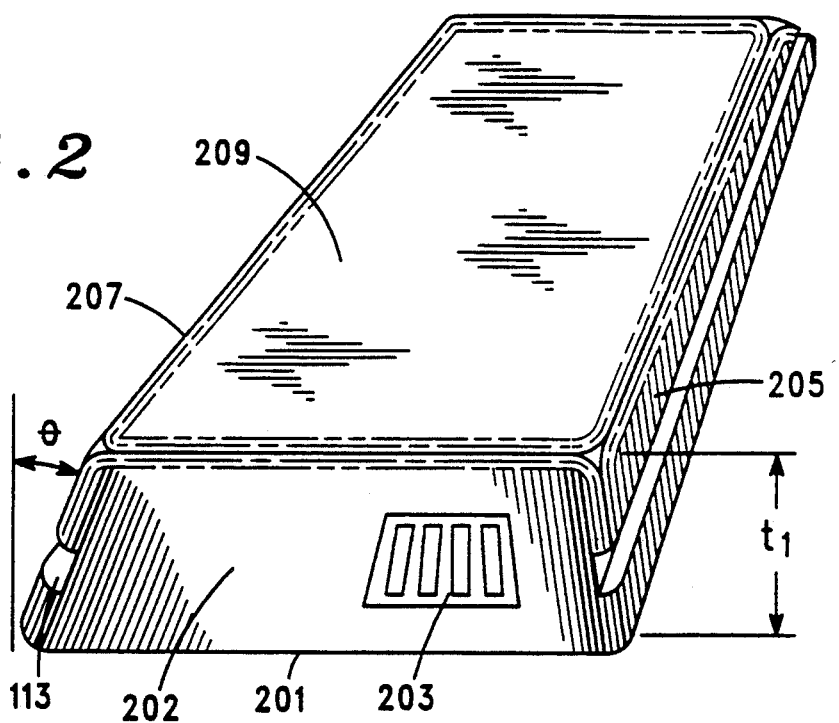
FIG. 2 is a single point perspective view of a small size battery housing which may be advantageously used by the present invention.
Figure 3:
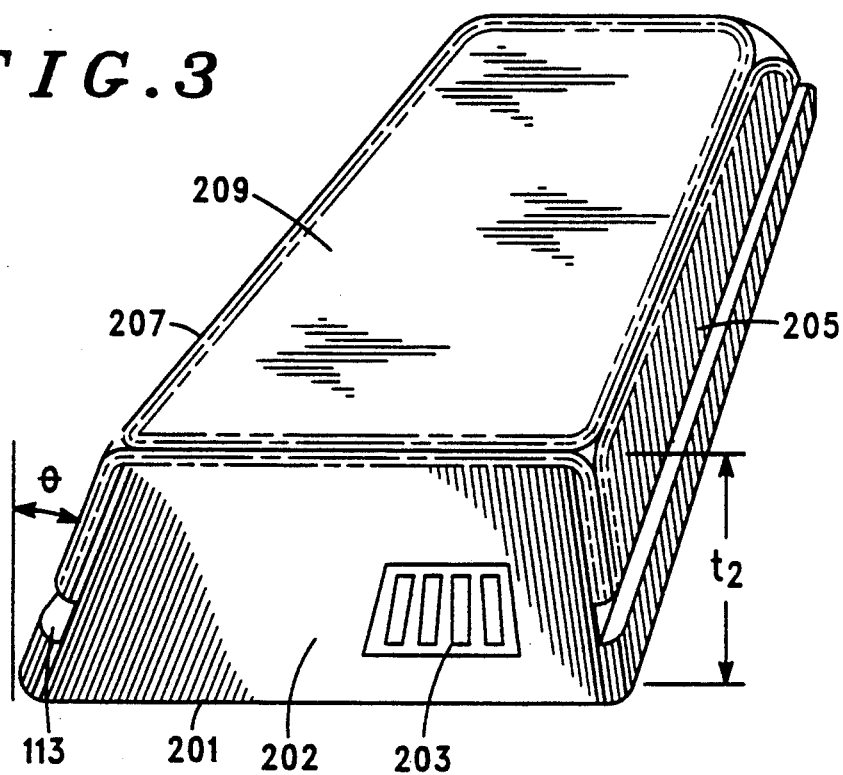
FIG. 3 is a single point perspective view of a large size battery housing which may be advantageously used by the present invention.

Referring now to FIGS. 2 and 3, which are single point perspective views of a small and large size battery housing respectively, it can be observed that the shape of the battery housings are essentially trapezoidal prisms. The bottom surfaces (201) of the battery housings shown in FIGS. 2 and 3 are surfaces which mate against the housing of the aforementioned cellular portable radio telephone during operation. A sloping surface (202) as shown in FIGS. 2 and 3 have electrical contacts (203) mounted thereon which are oriented so that the contacts (203) make electrical connection with charging contacts (115) of the battery charger (101) when the battery is placed in the battery charger. The charging contacts (115) of the battery charger housing (101) are located on the interior bottom surface (117) of the housing. The interior bottom surface (117) is an essentially flat surface parallel with the bottom of the battery charger housing.

The sides (205, 207) of the battery housing of FIGS. 2 and 3 slope inward at an angle 0 relative to a line perpendicular to surface (201). In the preferred embodiment, the angle 0 equals an angle of 10°. The difference in size between the small size battery of FIG. 2 and the large size battery of FIG. 3 is primarily a difference in thickness from the surface (201) to the top surface (209) in FIGS. 2 and 3. In the preferred embodiment, the battery housing thickness, $t_1$, of FIG. 2 is approximately 10 millimeters while the thickness, $t_2$, of the large size battery of FIG. 3 is approximately 20 millimeters. The battery charger of the present invention is so arranged that the contacts (203) of both the large size and the small size batteries are positioned in electrical contact with the charging contacts (115) of the battery charger when either battery is placed in the battery charger housing.

A vertical plane cross-sectional view of the battery charger of the present invention is shown in FIG. 4. In this view the battery rib member (111) of recess (103) and the battery rib member (401) of recess (105) may be seen. Rib members (111 and 401) are oriented at an angle $\phi$ relative to the plane of the bottom surface (117) of battery charger (101). In the preferred embodiment, $\phi = 30°$ and the rib member is approximately 29 millimeters long and 1.35 millimeters thick. The rib members, when engaged with the slots (113) of the battery housing (107), produce an alignment in the surface of the battery housing (107) carrying the contacts (203) parallel to the base of the battery charger (101) such that the battery charger contacts (115) make contact with the battery electrical contacts 203 regardless of whether the battery is the small or large size battery. The circuit board containing electronics of the battery charger is disposed beneath the battery charger base surface (403). This circuit board (405) is contained within the battery charger housing (101) and supports the electric contact members of the battery charger contacts (115 and 407). Power is supplied to the electronic circuitry on circuit board (405) by way of power jack (409).

A cross-sectional detail view of the side wall having interior surface (109) and exterior surface (505) is shown in FIG. 5. Although the cross-section illustrates a solid wall for ease of understanding, it is within the scope of the present invention to utilize a hollow wall construction. A cross-section of the small size battery (107) is shown contacting the interior side wall (109). Likewise, a cross-section of the large size battery is shown in dotted line and illustrates the position of the large size battery housing when contacting the interior side wall (109). It is to be noted that the surface (201) of both batteries is positioned on the same plane. The side wall itself is configured having a tapered cross-sectional shape with the largest area to the rear of the battery charger housing (101) and narrowing toward the front of battery charger (101). Thus an acute angle 0 is formed by the interior wall surface (109) of the battery charger pocket or recess (103, 105) and the exterior surface (505) of the battery charger housing (101). In the preferred embodiment, the interior wall surface (109) and the exterior surface (505) of the battery charger housing (101) are essentially planar wall surfaces and the imaginary planes formed by the walls, when extended, intersect in the angle 0 with the vertex of angle 0 toward the front of the battery charger housing (101). Since both the battery charger housing (101) interior walls and the sides of the battery housing (107) have the same value of angle 0, the battery is guided by the interior side walls as it is inserted into the charging pocket of the battery charger. As the battery is slid further down in the charging pocket, the slots (113) in the battery housing (107) engage the rib members (111) of the battery charger housing (101) to accurately position the battery and its charging contacts (203) relative to the charging contacts (115) of the battery charger.

The side wall of the battery charger housing extends to the front of the battery charger. At the front, the side wall curves inward to begin enclosing the charging pocket (103). The side wall terminates in a protrusion (507) which is used to captivate one of the surfaces of a portable cellular radiotelephone such as that previously mentioned (F09HGD8453AA) and similar to that shown in U.S. patent application Ser. No. 255,696, "Portable Telephone, Telephone Handset, or Similar Article" filed on behalf of Soren et al. on Oct. 11, 1988 and assigned to the assignee of the present invention. The use of protrusion (507) and a similar protrusion on the opposite side wall will hold the aforementioned cellular portable in the correct position so that an attached battery (having a conformal shape) will be charged while attached to the cellular portable.

We claim:

1. A housing for a battery charging apparatus which charges batteries of differing sizes, each battery having a housing shape conformal to at least part of the shape of a recess in the housing of the battery charging apparatus and having at least one slot disposed in the battery housing shape, the housing having a plurality of surfaces including top and bottom surfaces and comprising:

a recess in the top surface of the housing;

a wall of said recess extending from the top surface of the housing toward the bottom surface of the housing and having a predetermined contour corresponding to at least part of the shape of the battery housing; and a rib member disposed on said wall in a location which allows said rib member to engage the at least one slot disposed in the battery housing shape, below the top surface of the housing, and extending toward the bottom surface of the housing, whereby a battery to be charged can be inserted into said recess, being first guided by said wall and subsequently positioned by said rib member.

2. A housing for a battery charging apparatus in accordance with claim 1 further comprising an internal bottom surface in said recess.

3. A housing for a battery charging apparatus in accordance with claim 2 wherein said rib member forms an acute angle with the plane of said interior bottom surface.

4. A housing for a battery charging apparatus in accordance with claim 2 further comprising an electrical connector disposed on said interior bottom surface.

5. A housing for a battery charging apparatus in accordance with claim 2 further comprising a protrusion disposed on said wall, parallel to said rib member, and extending from the top surface of the housing toward said interior bottom surface.

6. A housing for a battery charging apparatus which charges batteries of differing sizes, each battery having a housing shape conformal to at least part of the shape of a recess in the housing of the battery charging apparatus and having at least one slot disposed in the battery housing shape, the housing having a plurality of surfaces including at least first, second, and third surfaces and comprising:
   a recess in the first surface of the housing, said recess having at least two interior sides and an interior bottom surface;
   a first interior side extending from the first surface of the housing to said interior bottom surface, disposed adjacent the second surface of the housing, and having a predetermined contour corresponding to at least part of the shape of the battery housing;
   a second interior side extending from the first surface of the housing to said interior bottom surface, disposed adjacent the third surface of the housing, and having a predetermined contour corresponding to at least part of the shape of the battery housing;
   a first rib member disposed on said first interior side in a location which allows said rib member to engage the at least one slot disposed in the battery housing shape, and extending from said interior bottom surface toward the first surface of the housing; and
   a second rib member disposed on said second interior side and extending from said interior bottom surface toward the first surface of the housing,
   whereby a battery to be charged can be inserted into said recess and be guided by said first and second interior sides and positioned by said first and second rib members.

7. A housing for a battery charging apparatus in accordance with claim 6 wherein said first rib member forms an acute angle with the plane of said interior bottom surface.

8. A housing for a battery charging apparatus in accordance with claim 6 wherein said second rib member forms an acute angle with the plane of said interior bottom surface.

9. A housing for a battery charging apparatus in accordance with claim 6 further comprising an electrical connector disposed on said interior bottom surface.

10. A housing for a battery charging apparatus in accordance with claim 6 further comprising a protrusion from said first interior side, parallel to said first rib member, and extending from the first surface of the housing toward said interior bottom surface.

11. A housing for a battery charging apparatus in accordance with claim 6 further comprising a protrusion from said second interior side, parallel to said second rib member, and extending from the first surface of the housing toward said interior bottom surface.

12. A battery charging apparatus for charging batteries of differing capacities of charge, each battery having lateral grooves and a shape conformal to at least part of the shape of a recess in the housing of the battery charging apparatus, the battery charging apparatus comprising:
   a housing having a plurality of external surfaces including at least first, second, third, and fourth external surfaces, said first and second external surfaces being essentially planar;
   a recess in said third external surface, said recess having at least two interior essentially planar sides and an interior bottom surface;
   a first interior side, of said at least two interior essentially planar sides, extending from said third external surface of said housing to said interior bottom surface and disposed adjacent said first external surface with the plane of said first interior side forming an acute angle with the plane of said first external surface and with the vertex of said acute angle disposed toward said fourth surface of said housing;
   a second interior side, of said at least two interior essentially planar sides, extending from said third external surface of said housing to said interior bottom surface and disposed adjacent said second external surface with the plane of said second interior side forming an acute angle with the plane of said second external surface and having the vertex of said acute angle disposed toward said fourth external surface of said housing;
   a first rib member disposed on said first interior side and extending from said interior bottom surface toward said third external surface to engage a groove on the battery; and
   a second rib member disposed on said second interior side and extending from said interior bottom surface toward said third external surface to engage a groove on the battery,
   whereby a battery to be charged can be inserted into said recess and be guided by said first and second interior sides and positioned by said first and second rib members.

13. A battery charging apparatus in accordance with claim 12 wherein said first rib member forms an acute angle with the plane of said interior bottom surface and with the vertex of said acute angle toward said third external surface.

14. A battery charging apparatus in accordance with claim 12 wherein said second rib member forms an acute angle with the plane of said interior bottom surface and with the vertex of said acute angle toward said third external surface.

15. A battery charging apparatus in accordance with claim 12 wherein said plurality of external surfaces further comprises a fifth external surface and wherein said interior bottom surface is disposed opposite said fifth internal surface of said housing with the plane of said interior bottom surface essentially parallel to a plane of said fifth external surface of said housing.

16. A battery charging apparatus in accordance with claim 12 further comprising an electrical connector disposed on said interior bottom surface.

17. A battery charging apparatus in accordance with claim 12 further comprising a protrusion from said first interior side, parallel to said first rib member, and extending from said third external surface toward said interior bottom surface.

18. A battery charging apparatus in accordance with claim 12 further comprising a protrusion from said second interior side, parallel to said second rib member, and extending from said third external surface toward said interior bottom surface.

19. A housing for a battery charging apparatus which charges batteries attached to portable electronic equipment and having differing battery sizes, each battery having a housing shape conformal to at least part of the shape of a recess in the housing of the battery charging apparatus and having at least one slot disposed in the battery housing shape, the housing having a plurality of surfaces including top and bottom surfaces and comprising:

a recess in the top surface of the housing;

a wall of said recess extending from the top surface of the housing toward the bottom surface of the housing and having a predetermined contour corresponding to at least part of the shape of the battery housing;

a rib member disposed on said wall in a location which allows said rib member to engage the at least one slot disposed in the battery housing shape, below said top surface of the housing, and extending toward said bottom surface of the housing; and a protrusion disposed on said wall, parallel to said rib member and extending from the top surface of the housing toward said interior bottom surface, whereby a battery to be charged which is attached to portable electronic equipment can be inserted into said recess, being first guided by said wall, subsequently positioned by said rib member, and held in position by said protrusion contacting the portable electronic equipment.

20. A housing for a battery charging apparatus in accordance with claim 19 further comprising an internal bottom surface in said recess.

21. A housing for a battery charging apparatus in accordance with claim 20 wherein said rib member and said protrusion each form an acute and essentially equal angle with the plane of said interior bottom surface.

22. A housing for a battery charging apparatus in accordance with claim 20 further comprising an electrical connector disposed on said interior bottom surface.

* * * * *